(12) United States Patent
Casile et al.

(10) Patent No.: US 6,769,026 B1
(45) Date of Patent: Jul. 27, 2004

(54) METHOD AND SYSTEM FOR ACCESSING INTELLIGENT NETWORK SERVICE APPLICATIONS

(75) Inventors: Olivier Casile, St Laurent du Var (FR); Jean-Jacques Legoll, Cagnes S/Mer (FR)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 09/620,265

(22) Filed: Jul. 19, 2000

(30) Foreign Application Priority Data

Mar. 20, 2000 (EP) ............................................ 00480029

(51) Int. Cl.[7] ........................ G06F 15/16; H04L 12/16
(52) U.S. Cl. ...................... 709/227; 370/260; 370/271; 455/414.1
(58) Field of Search ........................... 379/230, 221.07, 379/88.12, 114.15; 455/413, 414.1, 461, 415; 709/246, 227, 203; 370/260, 271

(56) References Cited

U.S. PATENT DOCUMENTS

| | | | | |
|---|---|---|---|---|
| 5,521,964 A | * | 5/1996 | Schull et al. ............ 379/88.12 |
| 5,926,536 A | * | 7/1999 | Orlamunder et al. .. 379/221.07 |
| 5,978,672 A | * | 11/1999 | Hartmaier et al. .......... 455/413 |
| 5,991,389 A | * | 11/1999 | Ram et al. .................. 379/230 |
| 6,064,729 A | * | 5/2000 | Cookson ..................... 379/230 |

* cited by examiner

Primary Examiner—John Follansbee
Assistant Examiner—Kenny Lin
(74) Attorney, Agent, or Firm—Duke W. Yee; Jerry W. Herndon; Patrick C. R. Holmes

(57) ABSTRACT

A system operating in the intelligent peripheral servers (IP) of an intelligent network, allowing a telephone user to access the service applications (SLPs) of the peripheral server it is connected to or other service applications (SLPs) located on a remote server (SCP) of the intelligent network. The system comprises a programming interface to develop service applications operating in the intelligent peripheral and a handler modifying the standardized communication protocol between the intelligent peripheral server and the remote servers. The service applications located in the servers (IP and SCP) are developed using the programming interface, the handler being adapted to each intelligent network protocol such as ITU/ETSI or BELLCORE or WIN standards used in direct mode, through a direct network communication between the remote and intelligent peripheral servers or a communication through the central exchange (SSP) of the switched telephone network to which the telephone user is connected.

14 Claims, 14 Drawing Sheets

METHOD AND SYSTEM FOR ACCESSING INTELLIGENT NETWORK SERVICE APPLICATIONS

TECHNICAL FIELD OF THE INVENTION

This invention relates to intelligent networks and more particularly to a method and system to access applications operating in the so-called Service Control Points (SCP) and Intelligent Peripherals (IP) of the public switching systems.

BACKGROUND OF THE INVENTION

In the telephone networks provided by the carriers, call routing and call processing were originally handled by public switching systems also called Central eXchanges (CX). Today, in the intelligent network architecture, the CXs still handle call routing but call processing and other features, forming the enhanced services offering of the carriers, are handled by intelligent network components which are satellites of the CXs. These intelligent components such as Service Control Points (SCP) and Intelligent Peripherals (IP) are real time computers running applications so called Service Logic Programs (SLP), and communicating with the CXs according to protocols which are generally standardized.

SLP applications for translation of phone call numbers, caller filtering etc. are running in the SCPs. Phone call number translation is simple when based on routing tables and handled by CXs. Call number translation handled by the SLPs is more complex. For example, for free 800 call numbers, the real call number depends on the date and time (rerouting to back up sites is performed during weekends or nights, for instance) or the call number origin location (the call maybe rerouted to the nearest site of the calling number). The SLPs running in IPs support voice interact with the caller for playing announcement to the calling party or prompting and collecting User Information from the calling party.

Intelligent network architectures are generally standardized. The Intelligent Network (IN) standard defined by the ITU-T comprises CS-1 (Q.121x family of Recommendations) and CS-2(Q.122x family of Recommendations); the Advanced Intelligent Network (AIN) standard is defined by Bellcore and the Wireless Intelligent Network (WIN) defines an extension of the TIA/EIA IS-41 Mobile Network Architecture for Mobile telephones. These three standards, ITU, AIN and WIN define, for instance, where to store the subscriber information; they define, more particularly, the communication between the CXs and the SCPs or IPs by specifying the characteristics of the network session, transport session and presentation layers of the OSI model.

Each SLP interfacing the presentation layer should be adapted to the standard it supports. This means that a SLP operating in an SCP or an IP compatible with Bellcore standards cannot be used in an SCP or IP compatible with ITU standards, or with WIN standards, and must be reworked when ported from an environment to the other. This is a problem for developers of networking software or integrated solution providers.

In addition, within the ITU and the Bellcore standards, there are two different sets of flow exchanges between the SCP and the IP which are either the direct connection mode or the relay mode through the Cx. The sequence of requests and responses which must be exchanged (and therefore transmitted from or received by the SLP) is different from one mode to the other and different for each of the standards (ITU or Bellcore, respectively).

If nothing is done to solve this problem, each SLP my need up to five different versions, depending upon the standard and the mode of connection. The first version follows the Bellcore standard and implements the direct connection mode so called 'SR-3511'. The second version follows the Bellcore standard but implements the relay mode so called 'GR-1129'. The third version follows the ITU standard and implements the direct mode so called 'ETSI CoreInap, direct connection configuration'. The fourth version of SLP follows the ITU standard and implements the relay mode so called ETSI CoreInap, relay configuration. When using the WIN(EIA/TIA) standard, a fifth version of SLP is necessary because although the semantics of the SCP-IP communication verbs are similar for wireline and wireless networks, the formats and protocols are different.

One of the objects of the invention is to enable the SLP programs to be executed in network equipment implementing any protocol of communication used in intelligent networks and any type of connection mode.

SUMMARY OF THE INVENTION

In brief, this and other objects are achieved by insulating the applications operating on the intelligent network components (the SLP) from the protocol exchanges with an independent application program interface, which hides the differences in syntax and in exchange flows, from the applications.

One of the advantages of the invention is to reduce development and maintenance costs of porting SLPs from one intelligent network environment to one other.

BRIEF DESCRIPTION OF THE DRAWINGS

The foregoing and other objects, aspects and advantages will be better understood from the following detailed description of a preferred embodiment of the invention with reference to the drawings in which.

DESCRIPTION OF THE PREFERRED EMBODIMENT

Figure 1:
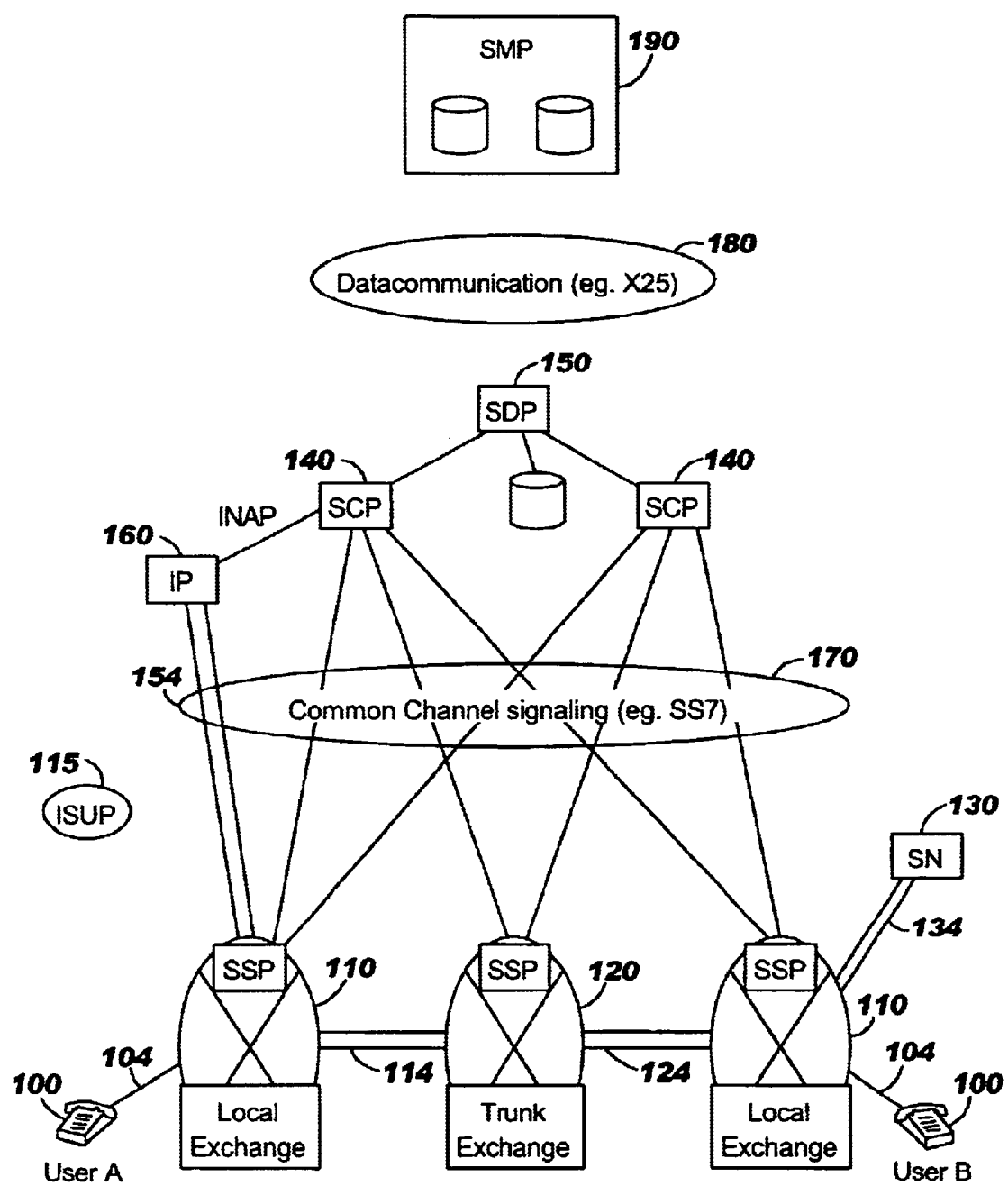
FIG. 1 illustrates an intelligent network.

FIG. 1 illustrates an intelligent network environment where the preferred embodiment can be implemented. A User (100) communicates with the Intelligent Network using his phone. His telephone line reaches a local Central exchange (SSL, local exchange 110) at the boundary of the public telephone network. For trunk lines inside the telephone network, more powerful trunk Central exchanges (SSL, trunk exchange, 120) are generally used. Both local exchanges and trunk exchanges are handling telephone call routing. The Service Node (SN, 130) connected to a local exchange provides additional computing resources to perform the telephone call routing if necessary. Other data connections are established between the local and trunk exchanges and the intelligent network components (IP, SN, SCP, SDP, SSP). These other connections can be leased lines. Lines between the users and the local exchanges (104) convey voice. A voice channel is also established between the local and trunk exchanges (114, 124) the local exchange and the Service Node (134) and between a local exchange and the IP (154). The IP is usually used intelligent networks to provide voice transfer of, for instance, the automatic voice messages that the user receives back on his telephone line. It is usually not the case of the SCP components which are processing data only. The standardized well known Common Channel signalling protocol SS7 (170) is used for communication between the exchanges (110, 120) and the IP and SCP components of the intelligent network. The data channel between the local exchange and the IP is a channel under SS7 protocol. In the preferred embodiment the lower network layers follow the ISUP (ISDN User Part) SS7 layer which is equivalent to ISDN for SS7 networks. In the preferred embodiment the INAP (Intelligent Network Application Part) protocol of the ITU/ETSI standard is used for communication between SCP and IP over the SS7 network layers.

SLPs are operating on both the SCP and IP components. The SCP components can use the services of a data base located on one other computer, the Service Control Point (SCP, 150). All the network components just described can be managed by a Service Management Point (SMP, 190) which is a computer such as a PC workstation through a data communication network which can be an X.25 network (180), for instance. In this environment, the preferred embodiment will be implemented in the IP and SCP components both running SLP for handling intelligent network applications. In FIG. 1, one SCP is directly connected to the IP as the other SCP is not directly connected to the IP. The communication between the latter SCP and IP is not in direct mode but in relay mode that is through the SSP.

Figure 2:
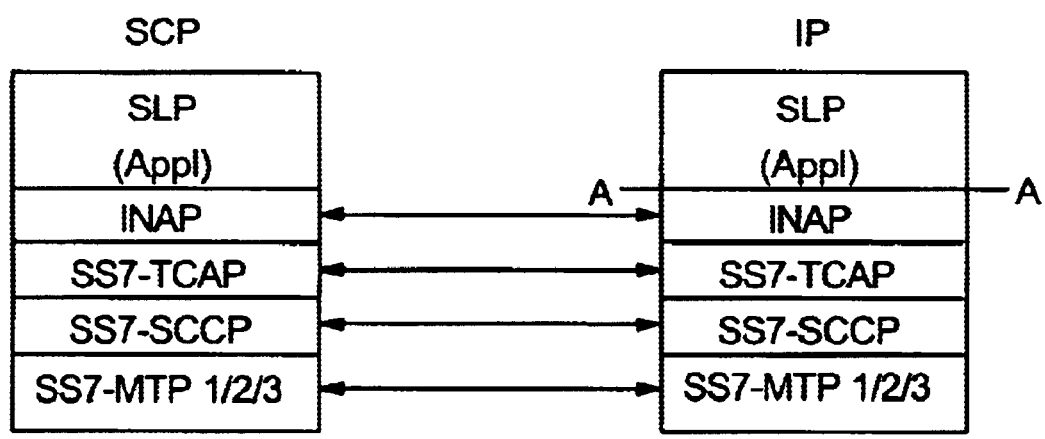
FIG. 2 shows the layering implemented in the SCP and IP intelligent network components when following the ITU/ETSI standard and when the SCP/IP connection uses the direct mode.

FIG. 2 shows the layering implemented in the SCP and IP intelligent network components when following the ITU/ETSI standard and when the SCP/IP connection uses the direct Mode. In this direct mode of communication, at least one signaling line is used between the SCP and the IP using the SS7 signaling protocol. The layers are illustrated in FIG. 2. With this ITU/ETSI standard, the Intelligent Network Application Part (INAP) protocol is used to build, send, receive and execute the requests and responses issued by the SSP, the SCP and the IP. These services are used by the SLP operating as a layer on top of the INAP layer. The AA line in the IP represents the interface, according to the preferred embodiment, allowing the SLP developed in the IP components to use the services provided by the INAP layer. In direct mode, as illustrated in FIG. 2, the INAP protocol is transported end-to-end over TCAP, the Transaction Capabilities Application Part, one of the SS7 layers. TCAP provides transaction functions (organize the requests and response dialog) for the INAP layer. The SCCP layer is the Signaling Connection Control Part of the SS7 protocol. Combined with MTP layer, SCCP provides the network services for the SS7 protocol upper layers. The Message Transfer Part (MTP) which is divided into three sublayers 1,2,3 represents the lowest layers of the SS7 protocol.

Figure 3:
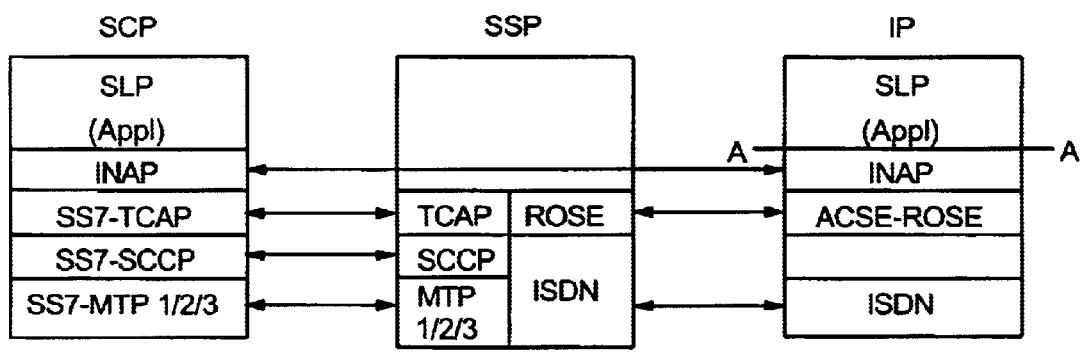
FIG. 3 shows the layering implemented in the SCP and IP intelligent network components when following the ITU/ETSI standard and when the SCP/IP connection uses the relay mode.

FIG. 3 shows the layering implemented in the SCP and IP intelligent network components when following the ITU/ETSI standard and when the SCP/IP connection uses the relay mode. In relay mode, the SCP component communicates with the IP component through the SSP exchanges. As with the direct mode, the SLP is developed using the services provided by the INAP layer. The AA line in the IP component illustrates the implementation of the preferred embodiment of the invention as an interface used by SLP to take advantage of INAP services, the same interface than the one used with the direct mode of operation for ITU/ETSI standard. The INAP protocol of ITU/ETSI is conveyed with TCAP between the SSP and the SCP through the SS7 signaling link. The INAP protocol can be conveyed between the SSP and IP components with TCAP, using the SS7 protocol. A second possibility is illustrated in FIG. 2 where the INAP protocol is conveyed through the SSP and IP components using a primary ISDN network signaling channel (D-Channel). The ACSE-ROSE layer (Remote Operation Service Element) encapsulates the INAP protocol in ISDN signaling frames. A third possibility which is not represented on FIG. 3, to convey INAP protocol between the SSP and IP components is to use ISUP, ISDN user part which is the SS7 layer equivalent to ISDN within the telecommunication network. It is the network-to-network form of ISDN.

Figure 4:
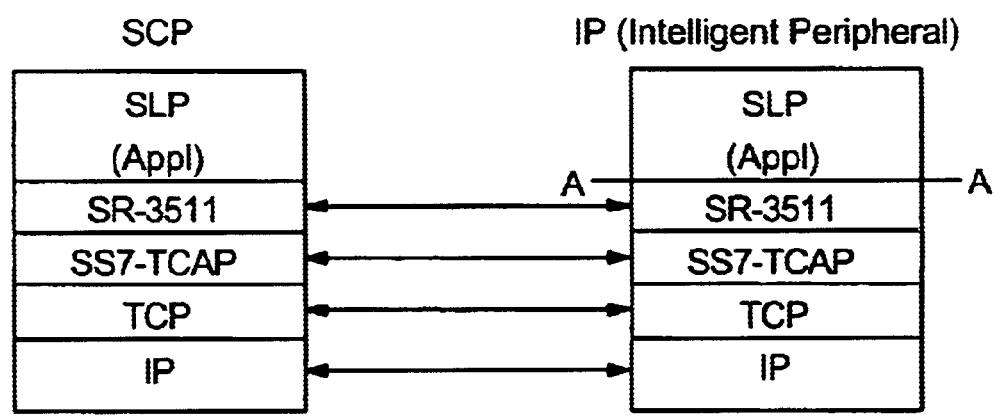
FIG. 4 shows the layering implemented in the SCP and IP intelligent network-components when following the Bellcore standard and when the SCP/IP connection uses the direct mode.

FIG. 4 shows the layering implemented in the SCP and IP intelligent network components when following the Bellcore standard and when the SCP/IP connection uses the direct mode. In the direct mode defined by Bellcore the SCP and IP components are directly connected by one or several TCP/IP connections forming the two lowest layers. TCP/IP transports SR-3511 specific Bellcore protocol end-to-end to build, send, receive and execute the requests and responses issued by the SSP, the SCP and the IP. These services are used by the SLP developed as a upper layer over the SR-3511 protocol. The AA line represents the interface of the preferred embodiment of the present invention used for SLP development in the IP components, the same interface than the one with the ITU/ETSI standard whatever is the mode of operation, direct or relay Mode. The SR-3511 protocol is conveyed over TCAP, an SS7 layer, as with the ITU/ETSI standard.

Figure 5:
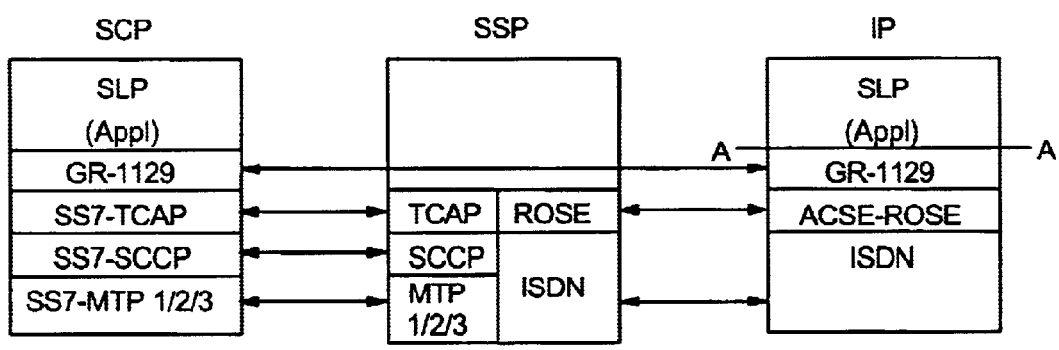
FIG. 5 shows the layering implemented in the SCP and IP intelligent network components when following the Bellcore standard and when the SCP/IP connection uses the relay mode.

FIG. 5 shows the layering implemented in the SCP and IP intelligent network components when following the Bellcore standard and when the SCP/IP connection uses the relay mode. The relay mode of Bellcore uses GR-1129, a different protocol than the SR-3511 protocol used in direct mode to build, send, receive and execute the requests and responses issued by the SSP, the SCP and the IP. Consequently to the use of a different protocol, the interface illustrated by the AA line, between the SLP and GR-1129 layers is the same interface, according to the preferred embodiment of the invention, to the one used in direct mode between SLP and SR-3511 layers. It is also the same interface than the one used with ITU/ETSI standard. Between SCP and SSP components the lower layers used are the SS7 protocol layers TCAP, SCCP and MTP used with the ITU/ETSI standard to convey the GR-1129 protocol. Between the SSP and IP components, two possible ways to convey the GR-1129 protocol are used by the Bellcore standard which are the SS7 layers (TCAP, SCCP and MTP) and the ISDN primary layers when the D channel of a primary ISDN line is used between the SSP and the IP components. Similarly to the ITU/ETSI standard, when ISDN line is used, the layer over ISDN is ROSE.

Figure 6:
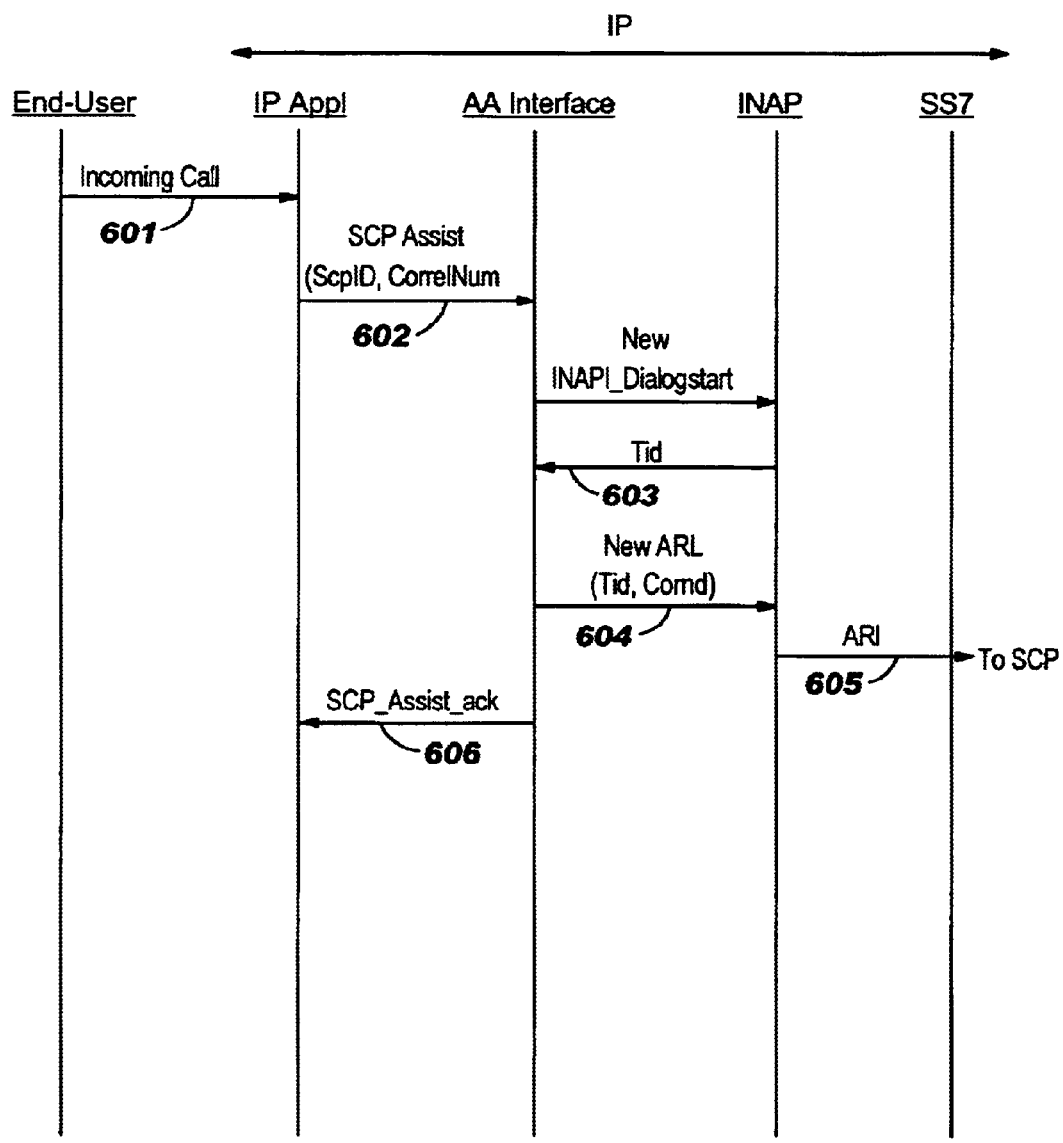
FIG. 6 describes the different steps of the method for establishing a caller connection when following the ETSI/ITU standard in direct mode.

FIG. 6 illustrates the different steps of the method of the preferred embodiment for establishing a caller connection. More particularly, the method introduces an example of two new verbs (SCP_Assist, SCP_Assist_ack) which are part of a service execution Application Programming Interface between the IP SLP applications and the network immediately lower layer, INAP. This interface is illustrated by the AA line. The method described in FIG. 6 is implemented in the IP Intelligent network components following the ETSI/ITU standard in direct mode.

The end-user sends an incoming call (601) directed by the SSP to the IP component. When the call is received in the IP component an IP SLP application is started. The IP SLP application at reception of the incoming call issues a new verb, the SCP_Assist verb (602) of the service execution API implemented on the AA interface between the SLP and the INAP. Particularly, the parameters provided to the SCP_Assist verb are ScpId and CorrelNum, they are defining the Identity of the SCP (ScpId) and the reference of the call being processed (CorrelNum). When receiving the SCP_Assist, the AA interface generates a requests for a new transaction id to the INAP layers in the form of a new INAPL_Dialogstart verb of the INAP protocol. The INAP layer sends back the transaction id (Tid) (603). The AA interface, upon reception of the Tid, generates (604) a new verb, the New AssistRequestInstructions (ARI) with the Tid, Corrid parameters which are defining the transaction id and the reference of the call being processed (same parameter as CorrelNum). Upon reception of the New ARI verb, an INAP verb ARI is then sent (605) by the INAP layer of the IP component, via the SS7 layers, to the INAP layer of the SCP component. Then, the AA interface sends (606) a new verb, the SCP_Assist_Ack verb to the IP SLP application to acknowledge the sending of the ARI verb to the SCP by the INAP protocol layer.

Figure 7:
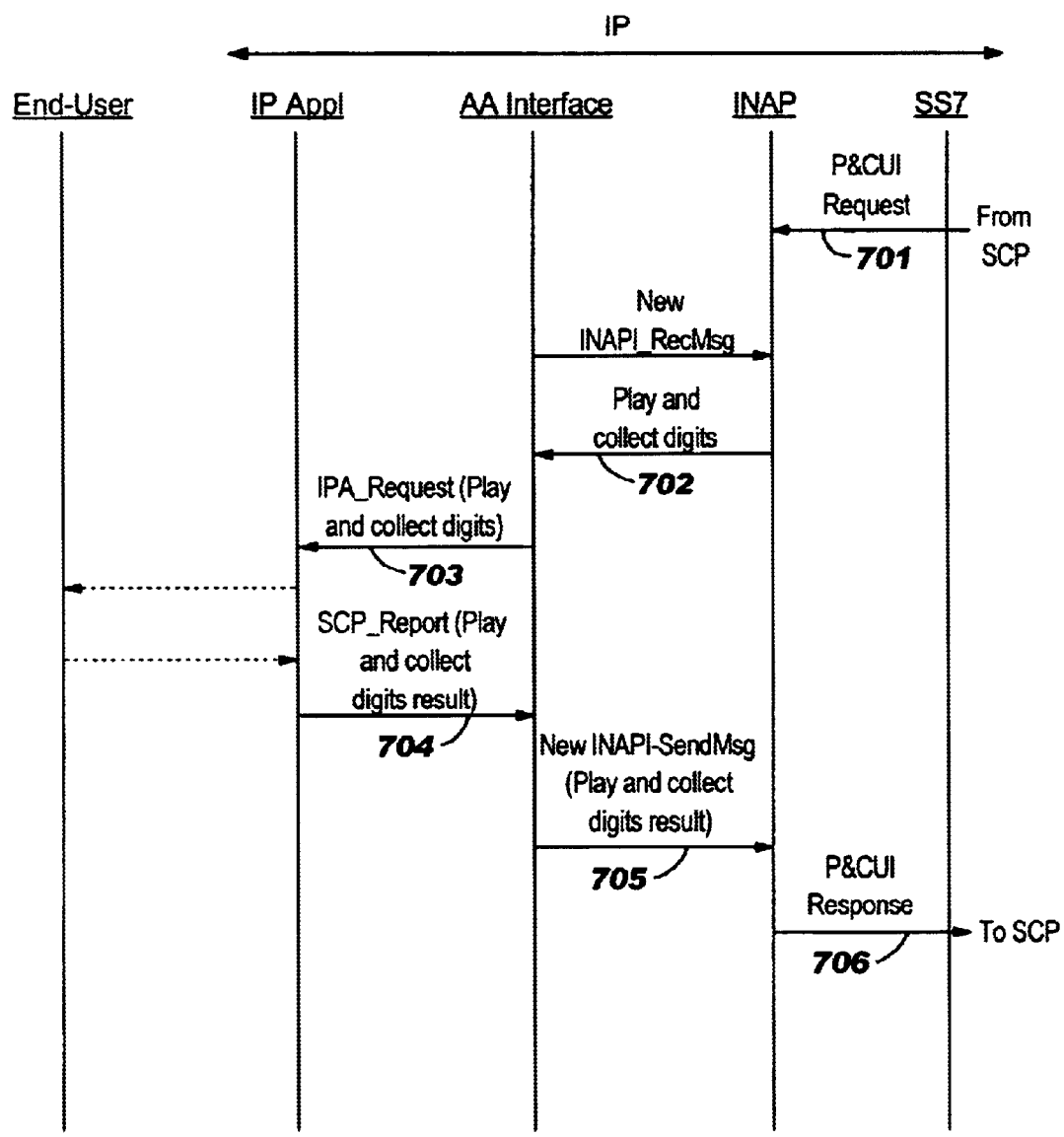
FIG. 7 describes the different steps of the method for establishing an interaction with the caller when following the ETSI/ITU standard in direct mode.

FIG. 7 illustrates the different steps of the method for establishing an interaction between the caller and the SCP. The method of FIG. 7 is implemented in the IP Intelligent network components following the ETSI/ITU standard in direct mode. In direct mode, a user interaction takes place once a user call has been established. It is always initiated by the SCP. The method of FIG. 7 introduces new verbs of the service execution Application-Programming Interface between the IP SLP applications and the network immediately lower layer which is INAP. A Prompt&CollectUserInformation (P&CUI) message from the SCP comes over the SS7 layers to the IP component and is held (701) within the INAP layer of the IP component. When the AA interface is ready to receive, it issues a new verb, INAPI_RecMsg. The INAP layer gets the P&CUI message encapsulated into an Invoke TCAP element. After decoding and checking of the message, the Play and collect digits structure is filled and sent by the INAP layer (702) to the AA interface. The AA interface translates the P&CUI structure into a new verb IPA_Request (Play and Collect digits) and sends it to the IP SLP application (703). The IP SLP application performs a vocal interaction with the user indicated with the dotted lines in FIG. 7. When the IP SLP application has terminated the end-user interaction, it sends a new SCP_Report verb (704) containing the operation results and the associated parameters. Upon reception of the SCP_Report by the AA interface, the AA interface translates the string command into a Play and collect result structure (705) and sends it via a New INAPI_SendMsg verb to the INAP layer. The INAP layer generates the P&CUI INAP verb encapsulates it into Invoke TCAP element and sends to the SCP over the SS7 layers (706).

Figure 8:
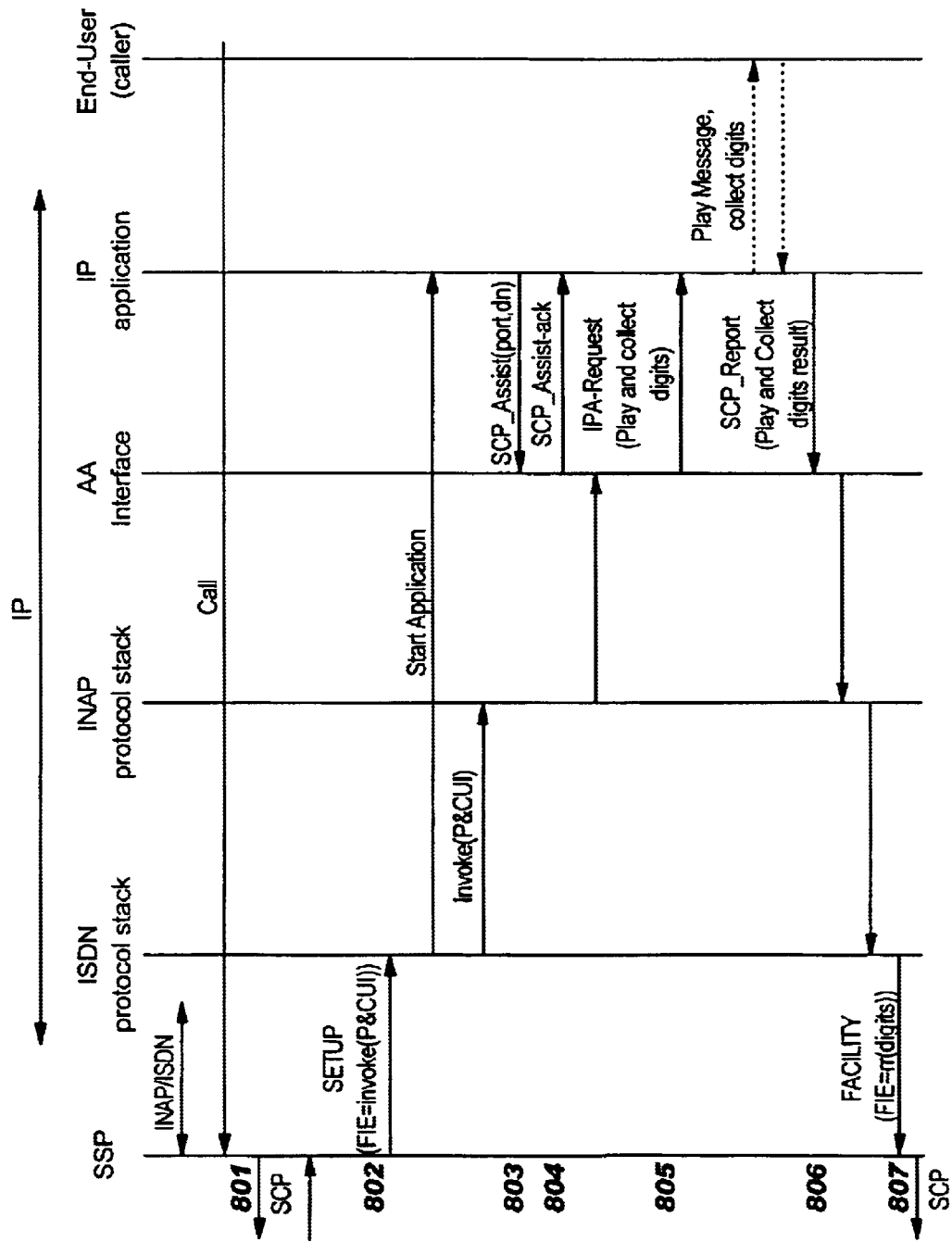
FIG. 8 describes the different steps of the methods for establishing a caller connection and for establishing an interaction with the caller when following the ETSI/ITU standard in relay mode.

FIG. 8 describes the different steps of the methods for establishing a caller connection and for establishing an interaction with the caller when following the ETSI/ITU standard in relay mode. In relay mode, the IP component cannot communicate directly with the SCP but rather communicates with the SSP which is connected with the SCP. In relay mode, the call establishment and the interaction with the user are started simultaneously. Between the SSP and the IP component the INAP protocol is encapsuled in ISDN signaling frames. This is an alternative to the SS7 protocol which can be used between the SSP and the IP one other possibility being ti use the SS7 ISUP layer instead of ISDN.

When the user sends a call (801) it always comes to the SSP, which, after an interaction with the SCP, route this call the the IP. A known ISDN SETUP verb is sent (802) by the SSP upon reception of an incoming call (801) issued by the user conveys simultaneously the Prompt&CollectUserInformation (P&CUI) INAP message (802). This causes the two operations of Caller connection and Caller interaction to be done simultaneously. The SETUP verb reception in the IP causes the IP SLP application to be started. The INAP message is queued in the INAP layer. As with the Caller connection in direct mode, the IP SLP application sends (803) the new SCP_Assist verb with port and dn as parameters which provide the port Id and dial number used by the incoming call which has triggered the IP application. When receiving the SCP_Assist issued by the IP SLP application, the AA interface does not initiate an exchange with the SCP, since the mode of operation is the relay mode. Instead, the AA interface immediately responds to the IP SLP application by sending an SCP_Assist ack verb (804), the same verb as with direct mode. The P&CUI INAP message is processed as with the direct mode by the AA interface when it is ready to receive. The AA Interface issues the IPA_Request (Play and collect digits) to the IP SLP application (805) which at its turn starts an interaction with the end user via the voice channel, by playing the prompt and collecting the DTMFs entered by the end user. (dotted lines). As with the direct mode, when the interaction is completed between the IP SLP application and the end user, the IP SLP application returns the results of the of the digit collection to the AA interface by issuing a SCP_Report verb (806) containing the operation result and associated parameters. As with the direct mode, the AA interface translates the SCP_Report message string command onto a new verb 'NEWPlay and Collect digits result' and issues the same new verb NewINAPI_SendMsg to the INAP layer. The InNAP layer builds the (P&CUI) response the SCP and passes it to the ISDN layer. The ISDN layer layer encapsulates the INAP message and transmits it to the SSP (807) using the known FACILITIE verb of the ISDN layer with the FIE parameter to transfer the message. The SSP will send this encapsulated INAP message to the SCP.

Figure 9:
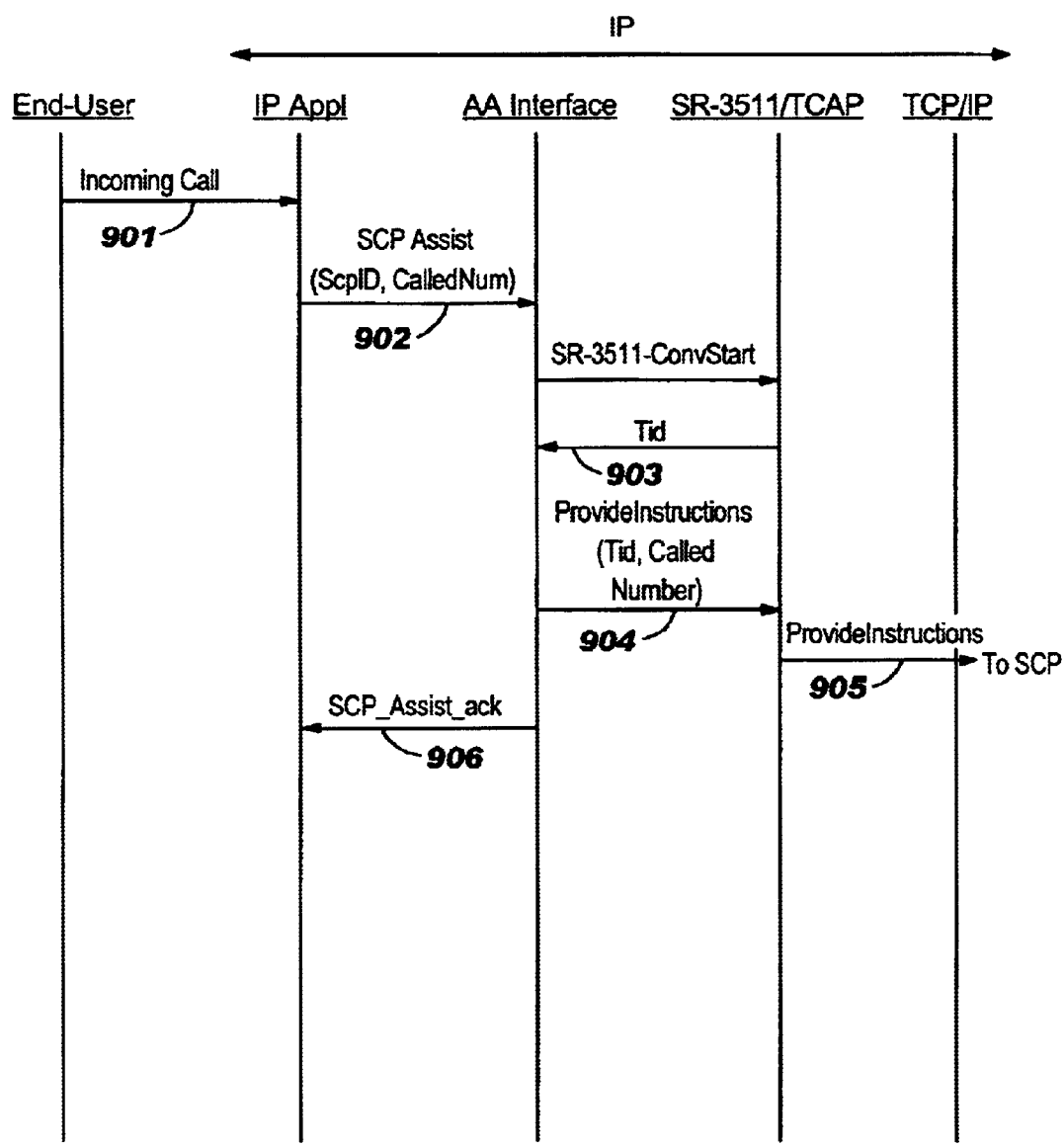
FIG. 9 describes the different steps of the method for establishing a caller connection when following the Bellcore standard in direct mode.

FIG. 9 describes the different steps of the method for establishing a caller connection when following the Bellcore standard in direct mode. The end-user sends an incoming call (901) directed by the SSP to the IP component. When a call reaches the IP component an IP SLP application is started. The IP SLP application at reception of the incoming call issues the same new verb, SCP_Assist (902) than with the ITU/ETSI standard to the AA interface between the SLP and the SR-3511 layer of the Bellcore IP component. When receiving the SCP_Assist, the AA interface generates a requests (903) for a new transaction id to the SR-3511 layer in the form of the new verb SR-3511_Convstart verb to the SR-3511 layer. The SR-3511 layer sends then back the transaction id (Tid). The AA interface, upon reception of the Tid, generates (904) the ProvideInstructions SR-3511 known command to the SCP with the Tid and the Called Number as parameters. The SR-3511 layer builds the message, encapsulated in a Query with Permission TCAP message and an Invoke Last TCAP element and sends it to the SCP (905) over a TCP/IP connection. The AA interface sends then (906) the new verb SCP_ASSIST ack to the IP application similarly what is done with the ITU/ETSI standard in direct mode.

Figure 10:
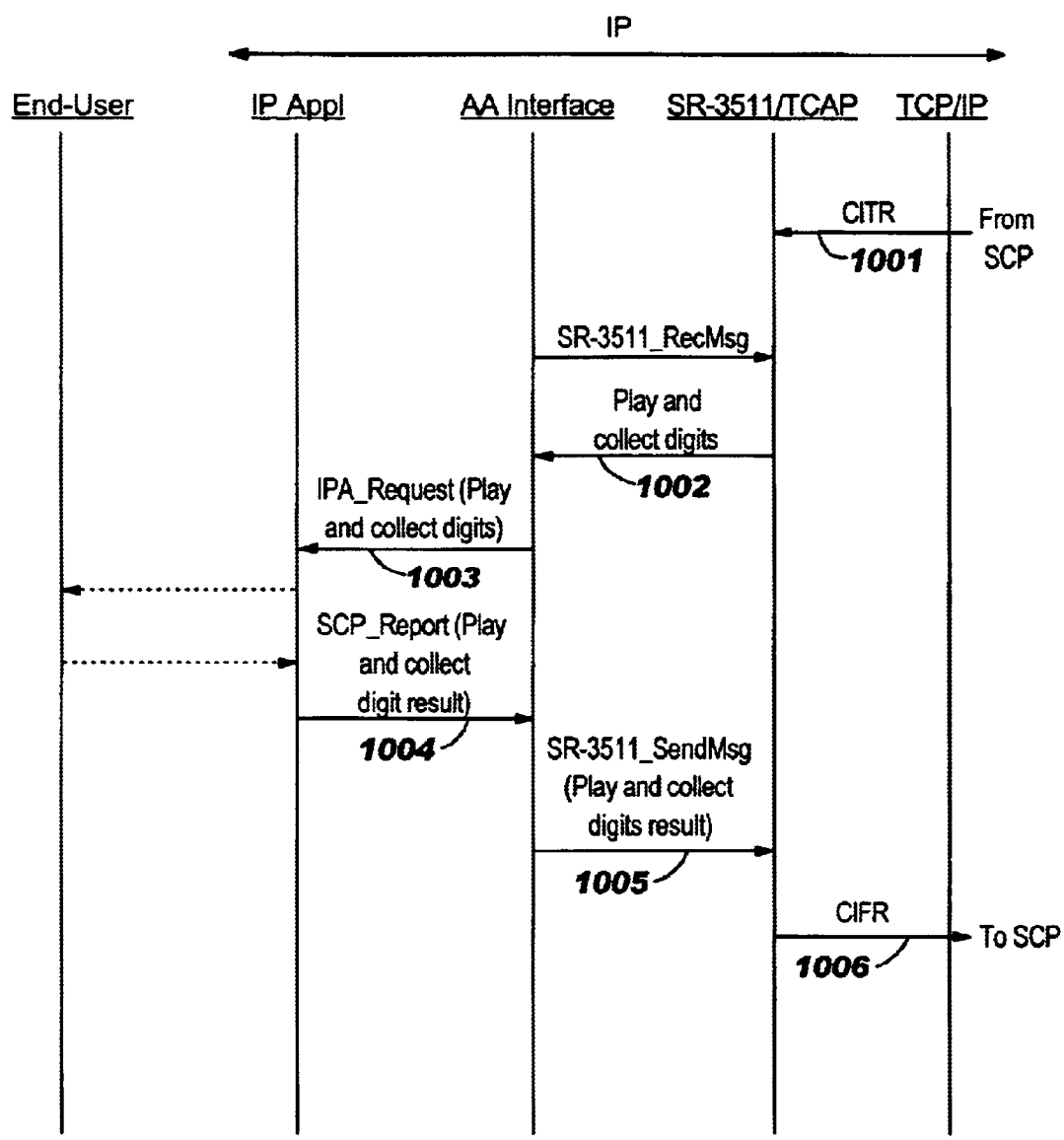
FIG. 10 describes the different steps of the method for establishing an interaction with the caller when following the Bellcore standard in direct mode.

FIG. 10 describes the different steps of the method for establishing an interaction with the caller when following the Bellcore standard in direct mode. This method here described is implemented in the IP Intelligent network components following the bellcore direct mode. A CallinfoToResource (CITR) SR-3511 message is sent (1001) over a TCP/IP connection from the SCP which always initiates the interaction. The message is held within the SR-3511 layer. When the AA interface is ready to receive, it advises the SR-3511 layer by issuing a new verb SR-3511_RecMsg. The SR-3511 layer gets the message encapsulated into a Conversation with Permission TCAP message and a Return-Result TCAP element. After decoding and checking of the message, a new verb NewPlay and collect digits structure is filled and sent to the AA interface (1002). The AA interface translates the Play and collect digit structure into a string command and sends it (1003) as an IPA_request to the IP application. The IP application performs an voice interaction with the end-user through the voice channel (dotted lines). When the IP application has completed the end-user interaction, it sends a new verb SCP_Report message (1004) containing the operation result and the associated parameters to the AA application. The AA interface translates the string command into a new verb Play and Collect Result structure and sends a new verb SR3511_SendMsg (1005) to convey it as a parameter towards the SR_3511 layer. The SR_3511 layer builds the known CallinfoFromResource SR_3511 message, encapsulates it into a Query with Permission (CIFR) TCAP message and an Invoke not Last TCAP element and sends it to the SCP (1006) over a TCP/IP connection.

Figure 11:
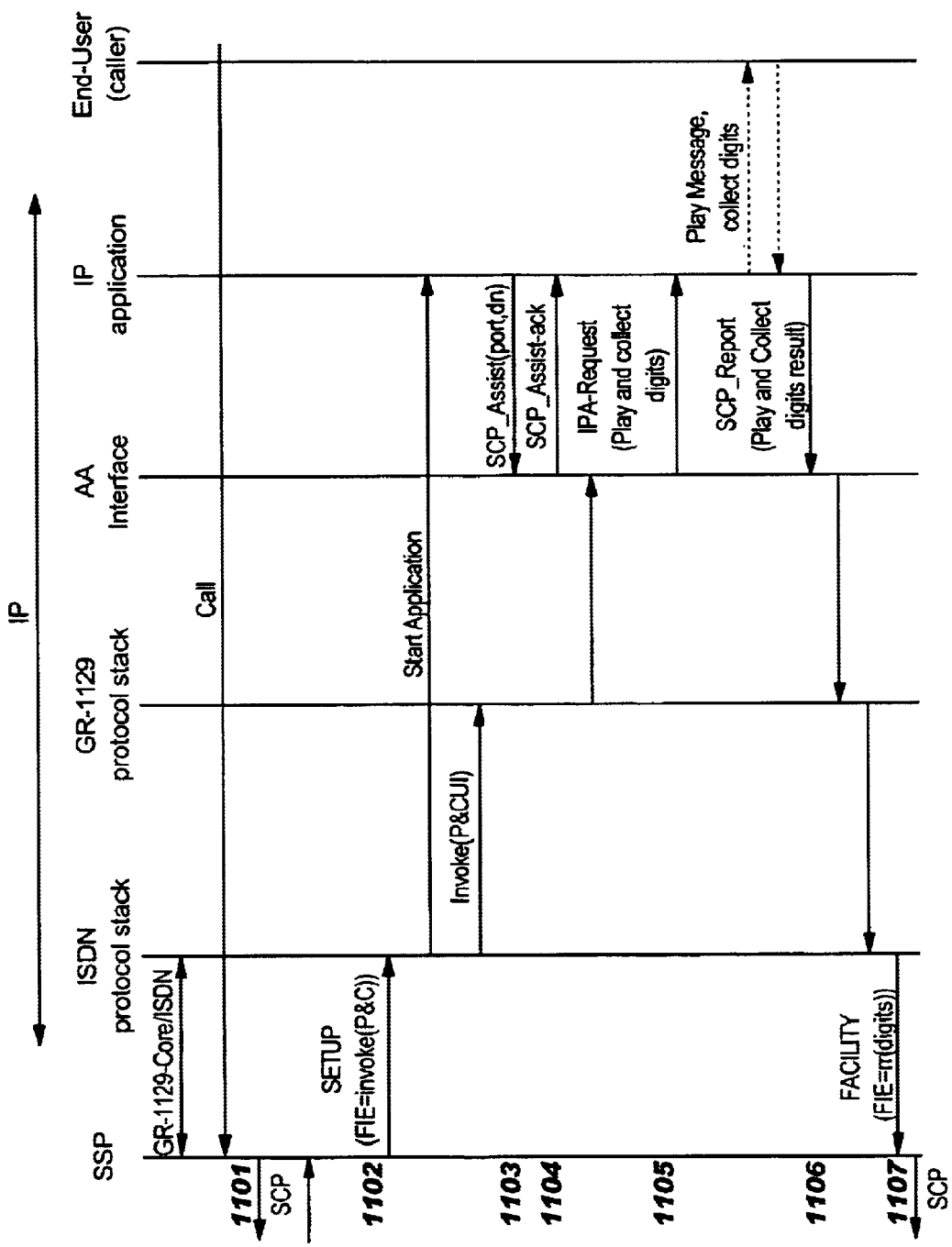
FIG. 11 describes the different steps of the methods for establishing a caller connection and for establishing an interaction with the caller when following the Bellcore standard in relay mode.

FIG. 11 describes the different steps of the methods for establishing a caller connection and for establishing an interaction with the caller when following the Bellcore standard in relay mode. In relay mode, the IP component cannot communicate directly with the SCP but rather communicates with the SSP which is connected with the SCP. In relay mode, the call establishment and the interaction with the user are started simultaneously. Between the SSP and the IP component the GR-1129 protocol is encapsuled in ISDN signaling frames using the ROSE layer. This is an alternative to the SS7 protocol layers (TCAP, CSSP, MTP 1/2/3) which can also be used to convey GR1129 protocol. The ISUP can be used in the place of ISDN which is the third possibility.

When the user sends a call (1101) it always comes to the SSP, which, after an interaction with the SCP, route this call the the IP SLP application. The ISDN call set-up message issued by the SSP unpon reception of an incoming call conveys simultaneously the Prompt&Collect (P&C) GR1129 message (1102). This causes the two operations of Caller connection and Caller interaction to be done simultaneously. The setup message itself causes the IP application to be started. The GR1129 message (SendToIpResource Invoke) is queued by the GR-1129 layer (1103). The IP SLP application generates upon reception of the user call a SCP_Assist with the port and dn parameters which provide port Id and dial number used by the incoming call which has triggered the IP application. When receiving the SCP_Assist issued by the IP SLP application, the AA interface does not initiate an exchange with the SCP, since the mode of operation is the relay mode. Instead, the AA interface immediately responds to the IP SLP application by sending a SCP_Assist_ack (1104), the same verb than with direct mode. The The P&C INAP message is processed as with the direct mode by the AA interface when it is ready to receive. The AA Interface issues the IPA_Request (Play and collect digits) to the IP SLP application (1105) which at its turn starts an interaction with the end user via the voice channel, by playing the prompt and collecting the DTMFs entered by the end user (dotted lines). As with the direct mode, when the interaction is completed between the IP SLP application and the end user, the IP SLP application returns the results of the of the digit collection to the AA interface by issuing a SCP_Report message (1106) containing the operation result and associated parameters. As with the direct mode, the AA interface translates the SCP_Report message string command onto a Play and Collect digits result structure and issues an GR-1129 message (SendToIpResource Result) for the SCP and gives to the SSP. The SSP will transmit that message to the SCP.

Figure 12:
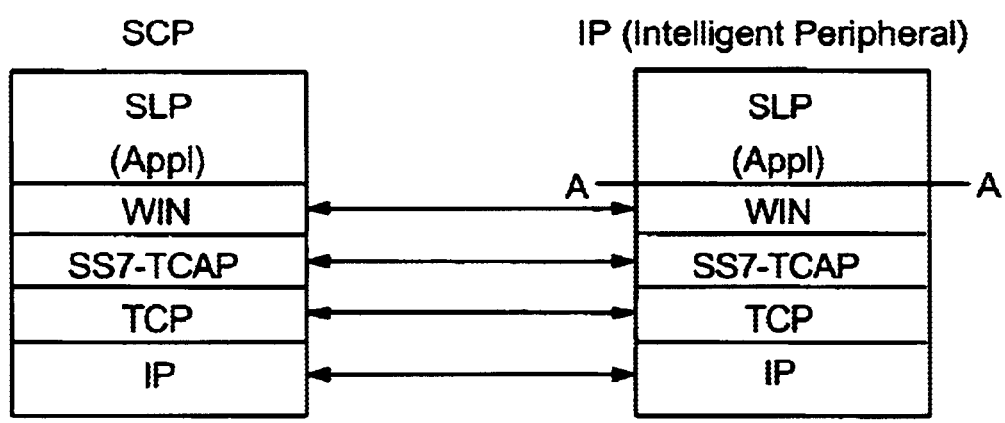
FIG. 12 shows the layering implemented in the SCP and IP intelligent network components when following the WIN (EIA/TIA) standard.

FIG. 12 shows the layering implemented in the SCP (1107) and IP intelligent network components when following the TIA/EIA WIN standard. In this standard the SCP and IP components are directly connected by one or several TCP/IP connections forming the two lowest layers. TCP/IP transports WIN specific protocol end-to-end to build, send, receive and execute the requests and responses issued by the SSP, the SCP and the IP. These services are used by the SLP developed as a upper layer over the WIN protocol. The AA line represents the interface of the preferred embodiment of the present invention used for SLP development in the IP components, the same interface than the one with the ITU/ETSI or BELLCORE standard whatever is the mode of operation for them, direct or relay mode. The WIN protocol is conveyed over TCAP, an SS7 layer, as with the ITU/ETSI and BELLCORE standard.

Figure 13:
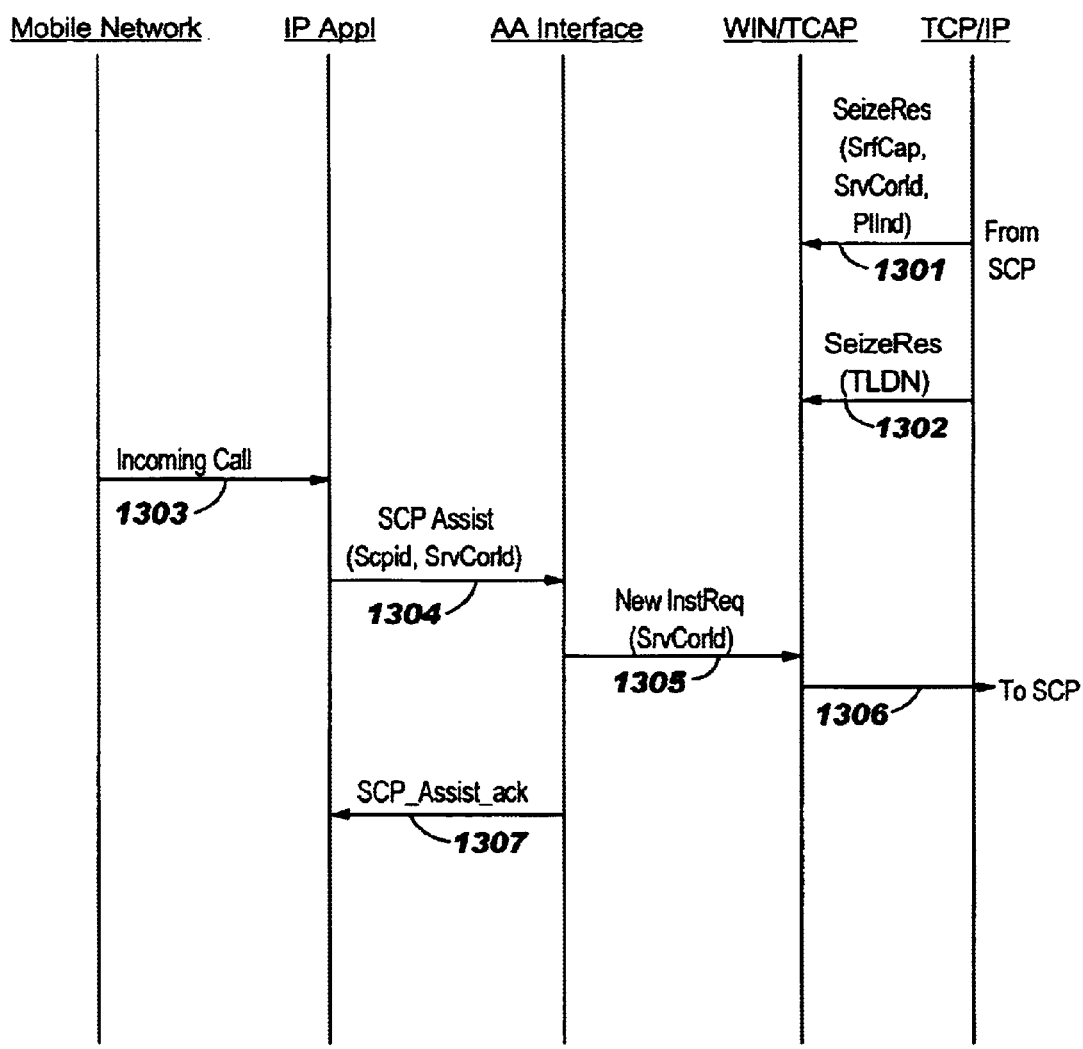
FIG. 13 describes the different steps of the method for establishing a caller connection when following the WIN (EIA/TIA) standard.

FIG. 13 illustrates the different steps of the method of the preferred embodiment for establishing a caller connection when using the TIA/EIA WIN standard. Compared to the other wired standards which have two possible modes of connection, the direct mode and the relay mode, with the WIN, there is only one mode of connection which is illustrated in the caller connection and the caller interaction described in FIG. 13 and FIG. 14.

More particularly, the caller interaction method introduces an example of two new verbs (SCP_Assist, SCP_Assist_ack) which are part of a service execution Application Programming Interface between the IP SLP applications and the network immediately lower layer, WIN for this standard. This interface is illustrated by the AA line.

With the wireless standard an exchange of information between the SCP and the IP are two steps necessary to before establishing the connection between the caller and the SCP through the IP application. These two initial steps are transparent for the IP application. The SCP sends (1301) to the IP system the correlation id (SvrCorId) which identifies the call. The SCP transmits this information through a standard SeizeRes command via TCP/IP. The IP system sends back (1302) to the SCP the access number (TLDN) which will be used by the SCP to transfer the call toward the IP system. The information TLDN is sent by the IP system using the SeizeRes command thru TCP/IP. Using this access number, the SCP instructs the MSC to originate a call toward the IP server. The MSC (for Mobile Switching Center) is the switching function in the mobile network. In a wireless Intelligent network, the MSC performs the same functions as the SSP in the case of a wired network.

The user call comes in (1303), it is directed to the IP component. When the call is received in the IP component an IP SLP application is started. The IP SLP application at reception of the incoming call issues a new verb, the SCP_Assist verb (1304) of the service execution API implemented on the AA interface between the SLP and the WIN/TCAP layer. Particularly, the parameters provided to the SCP_Assist verb are ScpId and SrvCorId, they are defining the Identity of the SCP (ScpId) and the reference of the call being processed (SrvCorId). When receiving the SCP_Assist, the AA interface generates (1305) a new verb, the New IntrReq verb toward the WIN/TCAP interface using the correlation Id SrvCorId. The WIN/TCAP interface converts this new verb into a verb of the WIN standard the InstReq verb and sends it (1306) over TCP/IP toward the SCP to establish the communication. Then, the AA interface sends a New SCP_Assist Ack to the IP application to acknowledge the request sent to the SCP.

Figure 14:
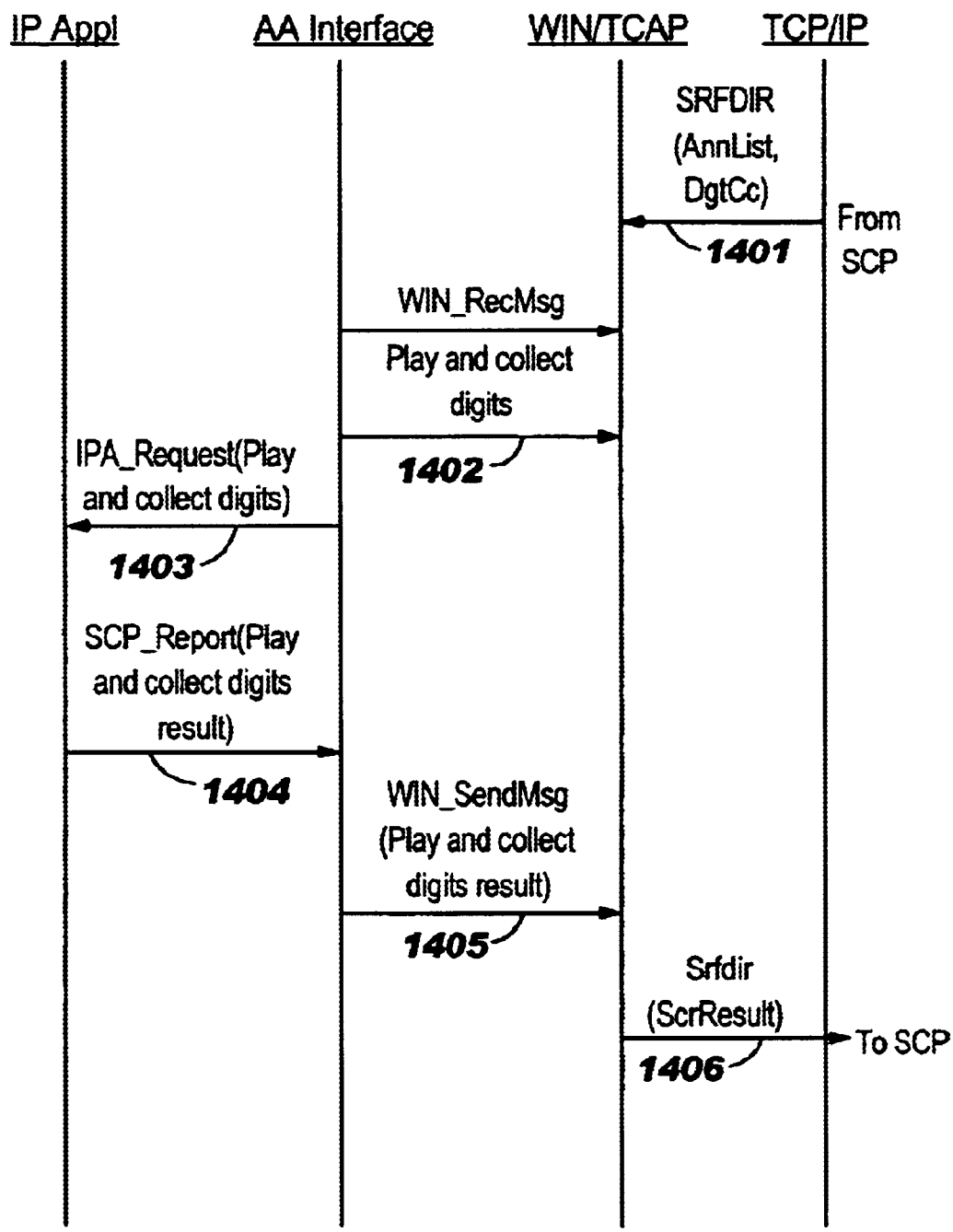
FIG. 14 describes the different steps of the method for establishing an interaction with the caller when following the WIN(EIA/TIA) standard.

FIG. 14 illustrates the different steps of the method for establishing an interaction between the caller and the SCP. The method of FIG. 14 is implemented in the IP Intelligent network components following the WIN standard protocol. The method of FIG. 14 introduces new verbs of the service execution Application Programming Interface between the IP SLP applications and the network immediately lower layer which is WIN. A SFRDIR message from the SCP comes over the SS7 TCP/IP layers to the IP component and is held (1401) within the WIN layer of the IP component. When the AA interface is ready to receive, it issues a new verb, WIN_ReckMsg. The WIN layer gets the SFRDIR WIN message encapsulated into a TCAP message. After decoding and checking of the message, the Play and collect digit structure is filled and sent by the WIN layer to the AA interface (1402). The AA interface translates the Play and collect digit structure into the new verb IPA_Request (Play and Collect digits) and sends it to the IP SLP application (1403). The IP SLP application performs a vocal interaction with the user. When the IP SLP application has terminated the end-user interaction, it sends the new SCP_Report verb (1404) containing the operation results and the associated parameters. Upon reception of the SCP_Report by the AA interface, the AA interface translates the string command into a Play and collect result structure and sends it via a new WIN_SendMsg verb (1405) to the WIN layer. The WIN layer generates then the Sfrdir WIN message, encapsulates it in a TCAP element and sends to the SCP over a TCP/IP connection (1406).

The AA interface, common to all the possible intelligent networks including the standardized protocols of the preferred embodiment. This interface can be enriched with new verbs each time a same verb has the same semantic in the different protocols and each time the semantic can be mapped as illustrated with the caller connection and the caller interaction operations. For each new verb of the programming interface, the upper layer protocol has to be adapted to support it.

What is claimed is:

1. A system for enabling telephone users connecting through a voice channel to a first computer of an intelligent network and accessing to service applications operating in said first computer, to access other service applications operating on a remote computer of said intelligent network, said system comprising:

a programming interface located in said first computer, having a set of programming interface applications invoked by said intelligent network service applications operating in said first computer for communicating with service applications operating in said remote computer or that conversely can be invoked by said intelligent network service applications operating in said remote computer for communicating with service applications operating in said first computer;

a handler added to an intelligent network communication protocol located in said first computer, said handler hooking the messages generated by said programming interface applications and mapping them onto messages following said intelligent network communication protocol and conversely hooking the messages following said intelligent communication protocols and mapping them onto messages directed to said programming interface applications; and an intelligent service application operating on said first computer;

wherein said intelligent service application invokes one of said programming interface applications for establishing a user call between the user and another intelligent service application operating on said remote computer by issuing a verb having as parameters the identification of the remote computer and the reference of the call to be established, said one of said programming interface applications further receiving a verb acknowledging the call establishment as being accepted by the remote computer.

2. The system in claim 1 wherein said messages following said intelligent network communication protocol are conveyed using a transport protocol over network data lines between said first and remote computer in so-called direct mode.

3. The system of claim 2 wherein the intelligent network application communication protocol used between said first computer and remote computer is the standardized ITU/ETSI INAP protocol, the transport protocol used between said first computer and said remote computer being the standardized SS7 protocol.

4. The system of claim 2 wherein the intelligent network application communication protocol used between said first computer and remote computer is the Bellcore SR-3511 protocol, the transport protocols used between said first computer and said remote computer being the standardized SS7-TCAP and TCP/IP.

5. The system of claim 2 wherein the intelligent network application communication protocol used between said first computer and remote computer is the (TIA/EIA) WIN protocol, the transport protocols used between said first computer and said remote computer being the standardized SS7-TCAP and TCP/IP.

6. The system of claim 1 wherein said messages following said intelligent network communication protocol are conveyed using a transport protocol over network data lines between said first computer and a central exchange of the intelligent network and between said central exchange and said remote computer in the so-called relay mode.

7. The system of claim 6 wherein the intelligent network application protocol used between said first computer and remote computer is the standardized ITU/ETSI INAP protocol, the transport protocols between said first computer and said central exchange being the standardized ROSE protocol and IDSN, the transport protocol used between said central exchange and said remote computer being the standardized SS7 protocol.

8. The system of claim 6 wherein the intelligent network application protocol used between said first computer and remote computer is the standardized ITU/ETSI INAP protocol, the transport protocols between said first computer and said central exchange being the standardized ROSE protocol and SS7 ISUP protocol, the transport protocol used between said central exchange and said remote computer being the standardized SS7 protocol.

9. The system of claim 6 wherein the intelligent network application protocol used between said first computer and remote computer is the standardized ITU/ETSI INAP protocol, the transport protocol used between said first computer and said central exchange and the transport protocol between said central exchange and said remote computer being the SS7 protocol.

10. The system of claim 6 wherein the intelligent network application protocol used between said first computer and remote computer is the Bellcore GR-1129 protocol, the transport protocols between said first computer and said central exchange being the standardized ROSE protocol and ISDN, the transport protocol used between said central exchange and said remote computer being the standardized SS7 protocol.

11. The system of claim 6 wherein the intelligent network application protocol used between said first computer and remote computer is the Bellcore GR-1129 protocol, the transport protocol used between said first computer and said central exchange and the transport protocol between said central exchange and said remote computer being the SS7 protocol.

12. A system for enabling telephone users connecting through a voice channel to a first computer of an intelligent network and accessing to service applications operating in said first computer, to access other service applications operating on a remote computer of said intelligent network, said system comprising:

a programming interface located in said first computer, having a set of programming interface applications invoked by said intelligent network service applications operating in said first computer for communicating with service applications operating in said remote computer or that conversely can be invoked by said intelligent network service applications operating in said remote computer for communicating with service applications operating in said first computer;

a handler added to an intelligent network communication protocol located in said first computer, said handler hooking the messages generated by said programming interface applications and mapping them onto messages following said intelligent network communication protocol and conversely hooking the messages following said intelligent communication protocols and mapping them onto messages directed to said programming interface applications; and an intelligent service application operating on said first computer;

wherein said intelligent service application invokes one of said programming interface applications for enabling a voice digit interaction between a user and another intelligent service application operating on said remote computer by receiving a verb having as parameters the message to be played to the user and a request for collecting digit answers, said one of said programming interface applications further sending a verb having as parameters the digit answer collected form the user.

13. A method for enabling telephone users connecting through a voice channel to a first computer of an intelligent network and accessing to service applications operating in said first computer, to access other service applications operating on a remote computer of said intelligent network, said method comprising the steps of:

installing a handling function interface into a network programming interface added to an intelligent network communication protocol, located in said first computer, said handling function;

hooking the messages initiated by the service applications operating in said first computer and generated by said programming interface for communicating with service applications operating is said remote computer; and mapping the messages onto messages following said intelligent network communication protocol and directed to a programming interface application operating on said remote computer;

said handling function further:
(a) hooking the messages initiated by the service applications operating in said remote computer, following said intelligent network communication protocol and generated by said programming interface for communicating with service applications operating on said first computer; and
(b) mapping them onto messages generated by said programming interface and directed to a programming interface application operating on said first computer; and invoking one of said programming interface applications for establishing a user call between the user and an intelligent service application operating on said remote computer by issuing a verb having as parameters the identification of the remote computer and the reference of the call to be established, said one of said programming interface applications further receiving a verb acknowledging the call establishment as being accepted by the remote computer.

14. A computer program product having computer readable program code for enabling telephone users connecting through a voice channel to said first computer of an intelligent network and accessing to service applications operating in said first computer, to access other service applications operating on a remote computer of said intelligent network, said computer readable program code comprising the steps of:

computer readable program code means for installing a handling function interface into a network programming interface added to an intelligent network communication protocol, located in said first computer, said handling function;

computer readable program code means for hooking the messages initiated by the service applications operating in said first computer and generated by said programming interface for communicating with service applications operating in said remote computer; and computer readable program code means for mapping the messages onto messages following said intelligent network communication protocol and directed to a programming interface application operating on said remote computer;

said handling function further:

(a) hooking the messages initiated by the service applications operating in said remote computer, following said intelligent network communication protocol and generated by said programming interface for communicating with service applications operating on said first computer; and (b) mapping them onto messages generated by said programming interface and directed to a programming interface application operating on said first computer; and computer readable program code means for invoking one of said programming interface applications for establishing a user call between the user and an intelligent service application operating on said remote computer by issuing a verb having as parameters the identification of the remote computer and the reference of the call to be established, said one of said programming interface applications further receiving a verb acknowledging the call establishment as being accepted by the remote computer.

\* \* \* \* \*